Feb. 13, 1962

C. C. MINTER 3,020,746

THERMAL CONDUCTIVITY LEAK DETECTOR

Filed Dec. 30, 1960

INVENTOR.

Clarke C. Minter

Feb. 13, 1962     C. C. MINTER     3,020,746
THERMAL CONDUCTIVITY LEAK DETECTOR

Filed Dec. 30, 1960     2 Sheets-Sheet 2

INVENTOR

Clarke C. Minter

3,020,746
THERMAL CONDUCTIVITY LEAK DETECTOR
Clarke C. Minter, 3136 Dumbarton Ave. NW.,
Washington, D.C.
Filed Dec. 30, 1960, Ser. No. 79,760
2 Claims. (Cl. 73—27)

This invention relates to leak detectors and describes an improved thermal conductivity leak detector for leak testing evacuated systems.

In a patent application (Serial No. 770,239) there was disclosed a design for a thermal conductivity leak detector. The design disclosed that air flowing from the leak to the pump passed first through one side of the bridge block and then through the other side. This arrangement caused a pressure drop between the two sides of the bridge, and although the bridge could be balanced when the pressure differential between the two sides of the bridge was constant, it was difficult to keep the bridge in balance when the pressure in the vacuum system was fluctuating. It was therefore difficult to locate a leak when the pressure was fluctuating for the reason that the effect of probe gas flowing in through the leak instead of air could be obscured by the effect of the pressure fluctuations on bridge balance.

Since it is well known that fluctuations of pressure occur in a system being evacuated the principal object of this invention therefore is to reduce the effect of unavoidable pressure fluctuations to such an extent that it would be possible to keep the bridge essentially in balance for a sufficiently long period of time so that there would be no doubt about the effect of probe gas flowing into the system through a leak instead of air.

Another object of the present invention is to provide a small, relatively cheap leak detector having approximately the same sensitivity as the relatively large and expensive helium mass spectrometer so widely used for leak detection.

Other objects and advantages of the present invention will become apparent by consideration of the following description and the accompanying drawings in which similar reference numerals are used for similar parts in the different views.

Figure 1:
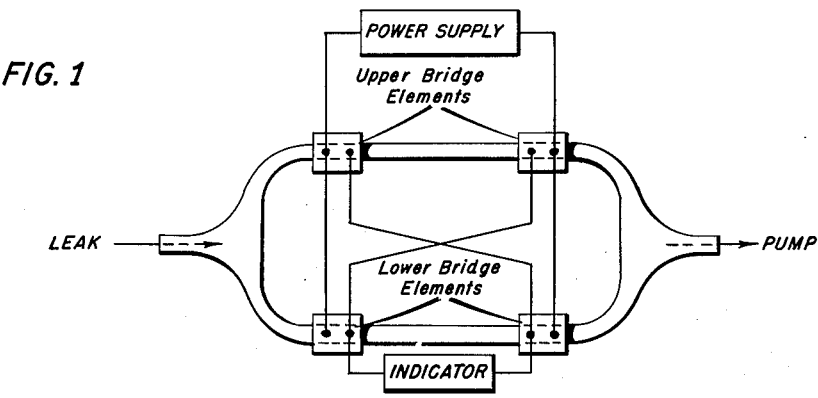
FIG. 1 is a schematic representation of the basic principles involved in the invention.

Since the primary object of this invention is to minimize the effect of pressure fluctuations on the balance of a thermal conductivity bridge used as a leak detector in a system being evacuated, it can be seen from FIG. 1 that this effect is accomplished by eliminating between the two sides of the bridge the pressure differential produced in the design disclosed in my pending application, Serial No. 770,239, in which air flows through one tube on its way from the leak to the vacuum pump. FIG. 1 shows that the air flowing from the leak to the pump is divided into two approximately equal streams so that other things being equal there should be no difference in the steady pressure between the upper and the lower pairs of bridge elements when air is flowing in through the leak. When unavoidable pressure fluctuations occur in such a system, the effect on bridge balance should be relatively negligible because the two sets of bridge elements would be affected equally.

Since the two parts of the bridge are mounted in a vertical plane, the action of gravity on the air in the system would be to develop an "altitude effect" which is to cause a slight tendency for the nitrogen and the oxygen to separate, more of the nitrogen going to the upper part of the bridge and more of the oxygen to the lower part. Also, a gas lighter than air flowing through the leak momentarily (as in leak hunting) will tend to flow upward through the tube communicating with the upper bridge elements and a balanced bridge will become unbalanced showing that the probe has passed over a leak. On the other hand, if a gas heavier than air flows through the leak it will tend to flow downward through the tube communicating with the lower bridge elements and a balanced bridge will become unbalanced in the opposite direction.

Figure 2:
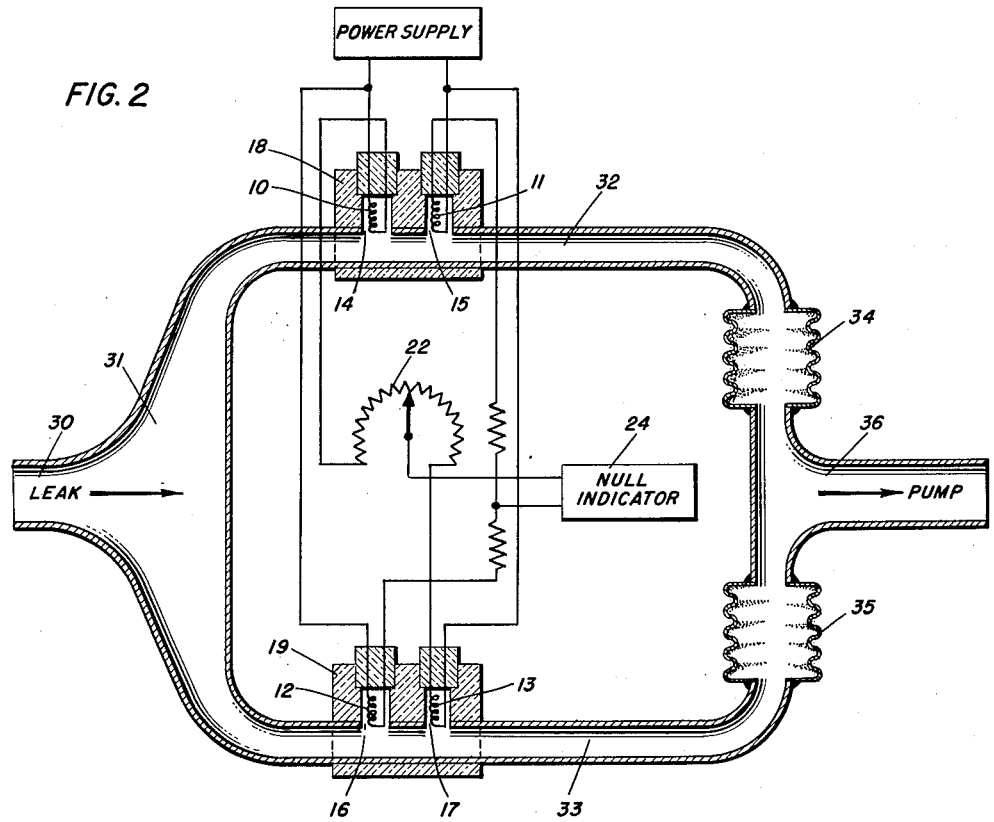
FIG. 2 is one embodiment of the invention for leak testing relatively small evacuated vessels.

In the form of the invention shown in FIG. 2, a relatively small vessel to be leak tested is attached to tube 30 and a suitable vacuum pump is attached to tube 36. When the pump has evacuated the entire system to the equilibrium pressure at which the pumping rate is equal to the leaking rate, the air flowing through the leak passes through tube 30 into an enlarged symmetrically shaped chamber 31 where it divides into two approximately equal streams which flow through similar tubes 32 and 33. The air flowing through tube 32 diffuses into similar cavities 14 and 15 cut into metal block 18 where it comes into contact with similar current-heated filaments 10 and 11. At the same time, the air flowing through tube 33 diffuses into cavities 16 and 17 cut into metal block 19 where it comes into contact with a pair of current-heated filaments 12 and 13 which are similar in characteristics to filaments 10 and 11. The two pairs of filaments are connected through small trimming resistors 20 and 21 and bridge balancing potentiometer 22 to form a Wheatstone bridge with the upper pair of elements on one diagonal of the bridge and the lower pair on the other diagonal. A constant voltage power supply 23 activates the bridge and the condition of balance of the bridge is indicated on a sensitive null indicator 24.

Filaments 10, 11, 12, 13 must be carefully matched so that if the pressure in the evacuated system fluctuates the bridge will not become unbalanced. A slight difference in the rate of flow of air through tubes 32 and 33 can develop a small differential in pressure of air in the two tubes. In order to reduce the possibility of such a pressure differential being developed, flexible bellows 34 and 35 are inserted in tubes 32 and 33 before they join to form tube 36, so that by raising or lowering tube 36 the effective lengths of tubes 32 and 33 can be varied in order to eliminate such differentials.

When the pumping rate is in equilibrium with the leaking rate potentiometer 22 is actuated until null indicator 24 indicates the bridge is in balance. A fine jet of probe gas, either lighter or heavier than air, is now moved over portions of the surface of the vessel being leak checked and if the jet passes over a leak some of the probe gas enters through the leak and mixes with the air inside the vessel. When the air containing the bit of probe gas enters tube 30 and passes into chamber 31, there will be a partial separation of probe gas and air owing to the action of gravity. If the probe gas is lighter than air, say hydrogen or helium, there will be a tendency for more of the lighter probe gas to pass upward in chamber 31 and then into tube 32 where it comes into contact with current-heated filaments 10 and 11. Since the thermal conductivity of the gas surrounding filaments 10 and 11 is greater than that of the gas surrounding filaments 12 and 13, the bridge will now become momentarily unbalanced thereby indicating that the probe had passed over a leak in the vessel being tested.

On the other hand, if the probe gas is heavier than air, say Freon-12, the mixture of Freon-12 and air will tend to separate in chamber 31 and more of the Freon-12 will pass into the lower bridgeblock 19 where it comes into contact with filaments 12 and 13, thereby unbalancing the bridge in a direction opposite to that obtained when the probe gas was lighter than air.

If null indicator 24 is equipped with a suitable pre-amplifier, the form of the invention just described can be used to detect leaks in small vessels which are of the same order of magnitude as those leaks detected by the mass spectrometer.

Figure 3:
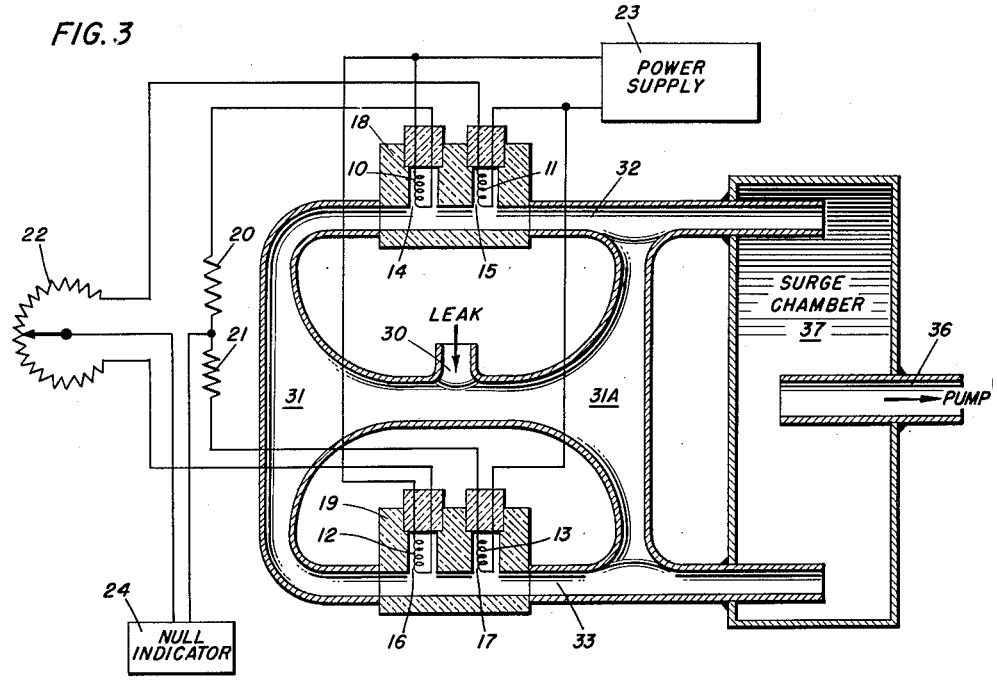
FIG. 3 is another embodiment of the invention for leak testing relatively small evacuated vessels.

The modification shown in FIG. 3 acts in principle in exactly the same manner as the form shown in FIG. 2 and need not be described in detail. However, slight differences in the arrangement of the tubing divides the airstream coming from the leak into two approximately equal and horizontally directed streams flowing into similar chambers 31 and 31A where each horizontally directed stream now divides vertically into two approximately equal and oppositely directed streams. In the FIG. 3 form, approximately ¼ of the air entering the leak flows through each bridgeblock instead of approximately ½ as in the FIG. 2 form. This arrangement should more nearly equalize the pressure in the upper and the lower tubes and render the bellows 34 and 35 in FIG. 2 unnecessary. The addition of surge chamber 37 also indicated in FIG. 3 will act to reduce the effect of irregularities in the pumping rate on the balance of the bridge.

Figure 4:
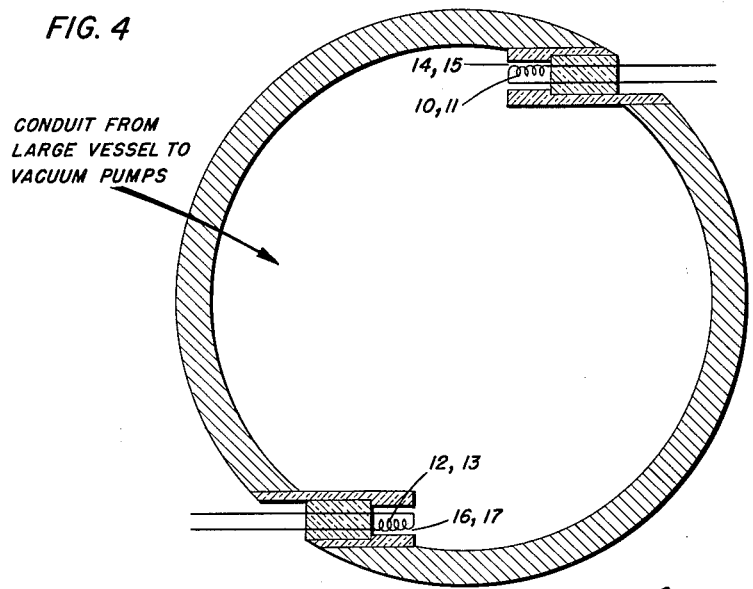
FIG. 4 is a view of the bridge elements mounted permanently in a large vacuum system.

In FIG. 4 there is shown how one pair of filaments 10 and 12, or 11 and 13, can be mounted in the conduit between a large evacuated vessel and a vacuum pump. In view of the detailed wiring diagrams in FIGS. 2 and 3, it is not necessary to show the entire bridge circuit in FIG. 4.

While this inventoin has been illustrated above in limited embodiments, it is understood that modifications and variations may be made without departing from the spirit and scope of the invention as defined by the appended claims.

What is claimed is:

1. A leak detector for detecting and locating leaks in a vessel being evacuated comprising fixed and variable resistances connected in the form of a Wheatstone bridge in which the active elements on one diagonal of the bridge are mounted in a metal block positioned in the same vertical plane with, and a suitable vertical distance from, a similar metal block in which the active elements of the other diagonal are mounted, a gas conduit bifurcated in a vertical plane to cause the air flowing from the vessel under evacuation to the vacuum pump to form two approximately equal streams to flow through the two similar metal blocks in which the active bridge elements are positioned, means for equalizing the airflow and/or the pressure in the two metal blocks, power means for actuating the bridge, and means for indicating when said bridge is unbalanced.

2. A leak detector for detecting and locating leaks in a vessel being evacuated comprising fixed and variable resistances connected in the form of a Wheatstone bridge in which the active elements on one diagonal of the bridge are mounted in a metal block positioned in the same vertical plane with and a suitable distance above a similar metal block in which are mounted the active elements of the other diagonal of the bridge, a gas conduit bifurcated in a horizontal plane so as to divide the gas flowing from the leak into two approximately equal and oppositely flowing horizontal streams, conduit means for dividing each of said horizontal streams into two approximately equal and oppositely flowing streams in the same vertical plane with said similar metal blocks, conduit means for causing approximately equal streams in said vertical plane to come into contact with the bridge elements in said similar metal blocks, means for equalizing the pressure and/or the flow of air in said similar metal blocks, power supply means for energizing the bridge and means for indicating when said bridge is unbalanced.

References Cited in the file of this patent
UNITED STATES PATENTS

| | | |
|---|---|---|
| 2,205,306 | Olshevsky | June 18, 1940 |
| 2,512,857 | Gow | June 27, 1950 |
| 2,652,716 | Blears et al. | Sept. 22, 1953 |

FOREIGN PATENTS

| | | |
|---|---|---|
| 891,171 | France | Nov. 29, 1943 |
| 841,937 | Great Britain | July 20, 1960 |